US012663744B2

(12) United States Patent
Kitano et al.

(10) Patent No.: US 12,663,744 B2
(45) Date of Patent: Jun. 23, 2026

(54) FIXING MEMBER FOR ELECTROPHOTOGRAPHY, FIXING DEVICE, ELECTROPHOTOGRAPHIC IMAGE FORMATION DEVICE, AND ADDITION CURING LIQUID SILICONE RUBBER MIXTURE

(71) Applicant: CANON KABUSHIKI KAISHA, Tokyo (JP)

(72) Inventors: Yuji Kitano, Kanagawa (JP); Matsutaka Maeda, Kanagawa (JP); Makoto Souma, Kanagawa (JP); Yasuhiro Miyahara, Tokyo (JP); Yutaro Yoshida, Kanagawa (JP); Shigeo Kuroda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 18/167,202

(22) Filed: Feb. 10, 2023

(65) Prior Publication Data

US 2023/0195015 A1 Jun. 22, 2023

Related U.S. Application Data

(63) Continuation of application No. PCT/JP2021/031836, filed on Aug. 31, 2021.

(30) Foreign Application Priority Data

Sep. 2, 2020 (JP) ................................ 2020-147535
Aug. 11, 2021 (JP) ................................ 2021-131162

(51) Int. Cl.
*C08G 77/08* (2006.01)
*C08G 77/12* (2006.01)
(Continued)

(52) U.S. Cl.
CPC ......... *G03G 15/2057* (2013.01); *C08G 77/08* (2013.01); *C08G 77/12* (2013.01);
(Continued)

(58) Field of Classification Search
CPC .... G03G 15/2057; C08G 77/08; C08G 77/12; C08G 77/20; C08K 3/02
See application file for complete search history.

(56) References Cited

U.S. PATENT DOCUMENTS 7,537,838 B2 5/2009 Hirabayashi et al.
9,268,273 B2 2/2016 Miyahara et al.
(Continued)

FOREIGN PATENT DOCUMENTS

EP 1 790 693 A1 5/2007
EP 3 611 573 A1 2/2020
(Continued)

OTHER PUBLICATIONS

JP-2008007590-A Translation (Year: 2025).*
(Continued)

*Primary Examiner* — Mark F. Huff
*Assistant Examiner* — Charles Collins Sullivan, IV
(74) *Attorney, Agent, or Firm* — Venable LLP

(57) ABSTRACT

A fixing member including: a substrate; and an elastic layer arranged on the substrate, wherein the elastic layer contains a silicone rubber and metal silicon powder dispersed in the silicone rubber, wherein the elastic layer has an elastic modulus of 0.10 MPa or more and 0.40 MPa or less, and wherein the metal silicon powder has an aspect ratio of 1.4 or more and 2.5 or less, and a repose angle of 35° or more and 52° or less.

8 Claims, 5 Drawing Sheets

(51) Int. Cl.

| | |
|---|---|
| ***C08G 77/20*** | (2006.01) |
| ***C08K 3/02*** | (2006.01) |
| ***G03G 15/20*** | (2006.01) |

(52) U.S. Cl.

CPC ................ *C08G 77/20* (2013.01); *C08K 3/02* (2013.01); *C08K 2003/023* (2013.01)

(56) References Cited

U.S. PATENT DOCUMENTS

| | | | | |
|---|---|---|---|---|
| 9,335,690 | B2 | 5/2016 | Asaka et al. | |
| 9,367,009 | B2 | 6/2016 | Akiyama et al. | |
| 9,395,666 | B2 | 7/2016 | Abe et al. | |
| 9,575,449 | B2 | 2/2017 | Oshima et al. | |
| 9,671,731 | B2 | 6/2017 | Matsunaka et al. | |
| 10,545,439 | B2 | 1/2020 | Matsumoto et al. | |
| 10,620,574 | B2 | 4/2020 | Kitano et al. | |
| 10,859,956 | B2 | 12/2020 | Maeda et al. | |
| 11,467,520 | B2 | 10/2022 | Kitano et al. | |
| 11,561,495 | B2 | 1/2023 | Kasai et al. | |
| 11,573,515 | B2 | 2/2023 | Miyahara et al. | |
| 11,635,717 | B2 | 4/2023 | Maeda et al. | |
| 2015/0177654 | A1* | 6/2015 | Arizumi ............... | G03G 15/206 399/333 |
| 2015/0212461 | A1* | 7/2015 | Abe ................... | G03G 15/2057 428/447 |
| 2018/0217538 | A1* | 8/2018 | Abe ................... | G03G 15/2057 |

FOREIGN PATENT DOCUMENTS

| | | | | |
|---|---|---|---|---|
| JP | 2007-171946 | A | | 7/2007 |
| JP | 2008007590 | A | * | 1/2008 |
| JP | 2014-191023 | A | | 10/2014 |
| JP | 2015118255 | A | * | 6/2015 |
| WO | 2022/050249 | A1 | | 3/2022 |

OTHER PUBLICATIONS

JP-2015118255-A Translation (Year: 2025).*

U.S. Appl. No. 18/066,426, filed Dec. 15, 2022, Kitano et al.

U.S. Appl. No. 18/299,241, filed Apr. 12, 2023, Miyahara et al.

Notice of Reasons for Refusal in Japanese Application No. 2021-131162 (Jul. 2025).

International Search Report in International Application No. PCT/JP2021/031836 (Oct. 2021).

Extended European Search Report in European Application No. 21864307.0 (Aug. 2024).

International Preliminary Report on Patentability in International Application No. PCT/JP2021/031836 (Mar. 2023).

* cited by examiner

FIXING MEMBER FOR ELECTROPHOTOGRAPHY, FIXING DEVICE, ELECTROPHOTOGRAPHIC IMAGE FORMATION DEVICE, AND ADDITION CURING LIQUID SILICONE RUBBER MIXTURE

CROSS-REFERENCE TO RELATED APPLICATIONS

This application is a Continuation of International Patent Application No. PCT/JP2021/031836, filed Aug. 31, 2021, which claims the benefit of Japanese Patent Application No. 2020-147535, filed Sep. 2, 2020, and Japanese Patent Application No. 2021-131162, filed Aug. 11, 2021, all of which are hereby incorporated by reference herein in their entirety.

BACKGROUND

The present disclosure relates to a fixing member for electrophotography to be used in an electrophotographic image forming apparatus, a fixing apparatus, and an electrophotographic image forming apparatus. The present disclosure also relates to an addition-curable liquid silicone rubber mixture.

DESCRIPTION OF THE RELATED ART

In a heat fixing apparatus to be used in an electrophotographic image forming apparatus, such as a copying machine or a printer, pairs of heated rotating bodies, such as rollers, a film and a roller, a belt and a roller, or belts, are brought into pressure contact with each other. Such rotating bodies are called fixing members. Further, a recording material holding an image formed with unfixed toner is introduced into a pressure contact portion (fixing nip) formed between the rotating bodies. Further, the unfixed toner is heated together with the recording material. The heated toner is pressurized against the recording material while being softened and melted, thereby being fixed onto the recording material as an image.

The rotating body which is directly brought into contact with the toner held on the recording material functions as a heating member, and examples of its form include a roller shape, a film shape and a belt shape. In addition, the rotating body that forms the fixing nip together with the heating member functions as a pressurizing member, and examples of its form include, as well as the heating member, a roller shape, a film shape and a belt shape. Of those fixing members, the fixing member to be brought into direct contact with the toner held on the recording material to heat the toner, i.e. the heating member is required to be capable of supplying the recording material and the toner with heat for softening and melting the toner in the fixing nip. Accordingly, there is a proposal that metal silicon powder be incorporated into an elastic layer in the fixing member to be used as the heating member in order to improve its thermal conductivity Japanese Patent Application Laid-Open No. 2007-171946).

A reduction in heat capacity of the heating member may be required for further shortening a first print-out time (FPOT). The metal silicon powder is effective not only in improving the thermal conductivity of the elastic layer but also in reducing the heat capacity of the elastic layer. Here, in order to further improve the thermal conductivity of the elastic layer with the metal silicon powder, the inventors have made an investigation on the use of powder having a high aspect ratio as the metal silicon powder. Specifically, the inventors made an investigation on the incorporation of metal silicon powder having an aspect ratio of, for example, from 1.4 to 2.5 into the elastic layer. The investigation was based on the following discussion: metal silicon powder having an aspect ratio larger than that of spherical metal silicon powder more easily forms a heat flow path through contact between the particles of the metal silicon powder in the elastic layer. As a result of the investigation, the inventors recognized that the elastic layer having incorporated thereinto the metal silicon powder having an aspect ratio of from 1.4 to 2.5 was improved in thermal conductivity. However, the inventors found the following new problem: when the elastic layer containing such metal silicon powder having a high aspect ratio is repeatedly compressed under a high temperature of, for example, more than 200° C., its breakage or plastic deformation occurs. The problem was particularly remarkably observed particularly in a flexible elastic layer having an elastic modulus of 0.4 MPa or less.

In view of the foregoing, the inventors have recognized that the development of a new technology for preventing the occurrence of the breakage or plastic deformation of the elastic layer resulting from the use of the metal silicon powder having a high aspect ratio is required for achieving a further reduction in hardness of the elastic layer while achieving an improvement in thermal conductivity of the elastic layer and a reduction in heat capacity thereof through the incorporation of the metal silicon powder.

SUMMARY

At least one aspect of the present disclosure is directed to providing the following fixing member: despite the fact that the fixing member includes an elastic layer containing metal silicon powder having a high aspect ratio, its breakage or plastic deformation hardly occurs even when the member is used for a long time period. At least one aspect of the present disclosure is directed to providing a fixing apparatus and an electrophotographic image forming apparatus each of which is capable of stably forming a high-quality electrophotographic image. Further, at least one aspect of the present disclosure is directed to providing an addition-curable liquid silicone rubber mixture providing the following silicone rubber cured product: while the cured product contains metal silicon powder having a high aspect ratio, its breakage or plastic deformation hardly occurs even when the cured product is repeatedly compressed.

According to at least one aspect of the present disclosure, there is provided a fixing member including: a substrate; and an elastic layer arranged on the substrate, the elastic layer containing a silicone rubber and metal silicon powder dispersed in the silicone rubber, the elastic layer having an elastic modulus of 0.10 MPa or more and 0.40 MPa or less, and the metal silicon powder having an aspect ratio of 1.4 or more and 2.5 or less, and having a repose angle of 35° or more and 52° or less.

According to at least one aspect of the present disclosure, there is provided a fixing apparatus including the above-mentioned fixing member. According to another aspect of the present disclosure, there is provided an electrophotographic image forming apparatus including the above-mentioned fixing apparatus.

According to at least one aspect of the present disclosure, there is provided an addition-curable liquid silicone rubber mixture including: an addition-curable liquid silicone rubber; and metal silicon powder, wherein the metal silicon powder has an aspect ratio of 1.4 or more and 2.5 or less, and a repose angle of 35° or more and 52° or less.

Further features of the present disclosure will become apparent from the following description of exemplary embodiments with reference to the attached drawings.

DESCRIPTION OF THE EMBODIMENTS

Although the reason why when an elastic layer containing metal silicon powder having a high aspect ratio is repeatedly compressed under a high temperature of, for example, more than 200° C., the breakage or plastic deformation of the elastic layer may occur is unclear, it is considered that the metal silicon powder having a high aspect ratio has a pointed corner, and hence when the elastic layer is repeatedly compressed, a stress concentrates on the corner portion of the metal silicon powder.

Based on the above discussion, the inventors have tried incorporating metal silicon powder, which has been subjected to treatment for rounding its pointed part (hereinafter also referred to as "pointed part-rounding treatment") while maintaining a high aspect ratio, into the elastic layer. As a result, the inventors have found that the breakage or plastic deformation of the elastic layer can be satisfactorily prevented even when the layer is repeatedly compressed under high temperature.

Here, the degree of the pointed part-rounding treatment of the metal silicon powder has a correlation with the repose angle of the metal silicon powder. That is, the metal silicon powder subjected to the pointed part-rounding treatment hardly piles up in a mountain manner as a powder accumulate, and hence its angle of repose tends to reduce. The repose angle may be measured in conformity with a method specified in "Alumina powder-Part 2: Determination of physical properties-2: Angle of repose" according to Japanese Industrial Standards (JIS) R9301-2-2:1999.

In addition, in an elastic layer containing metal silicon powder having an aspect ratio of 1.4 or more and 2.5 or less, and a repose angle of 35° or more and 52° or less, even when the elastic modulus of the elastic layer is 0.4 MPa or less, the occurrence of the breakage or plastic deformation of the elastic layer due to its repeated compression under high temperature can be prevented.

The present disclosure is described in detail below.

Fixing Member

The configuration of a fixing member according to one aspect of the present disclosure is described with reference to the drawings.

Figure 1A:
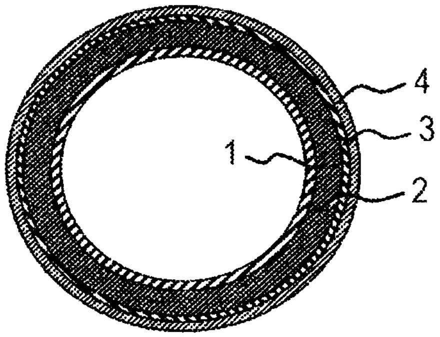
FIG. 1A is a sectional view of a fixing member according to the present disclosure having an endless belt shape.
Figure 1B:
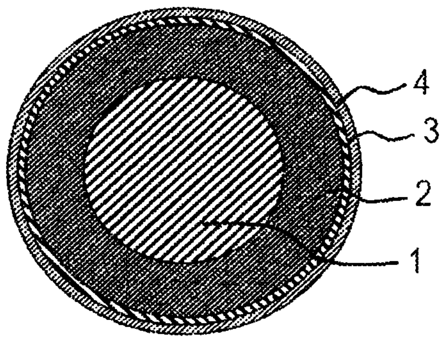
FIG. 1B is a sectional view of a fixing member according to the present disclosure having a roller shape.

FIG. 1A and FIG. 1B are each a sectional view of a fixing member according to one aspect of the present disclosure. FIG. 1A is an illustration of an example of a fixing member having an endless belt shape (hereinafter also referred to as "fixing belt"), and FIG. 1B is an illustration of an example of a fixing member having a roller shape (hereinafter also referred to as "fixing roller"). In each of FIG. 1A and FIG. 1B, a substrate is represented by reference numeral 1, and a silicone rubber-containing elastic layer covering the outer peripheral surface of the substrate 1 is represented by reference numeral 2. As described above, the fixing member according to the present disclosure includes the substrate 1 and the silicone rubber-containing elastic layer 2 on the substrate 1. As illustrated in each of those figures, the fixing member may include a surface layer 4 on the silicone rubber-containing elastic layer 2. In addition, the member may include an adhesion layer 3 between the silicone rubber-containing elastic layer 2 and the surface layer 4, and in this case, the surface layer 4 is fixed on the outer peripheral surface of the silicone rubber-containing elastic layer 2 by the adhesion layer 3.

Substrate

When the fixing member is such a fixing belt as illustrated in FIG. 1A, a metal, such as an electroformed nickel sleeve or a stainless-steel sleeve, or a heat-resistant resin such as polyimide may be used for its substrate. On the outer surface (surface on the silicone rubber-containing elastic layer side) of the substrate, a layer for imparting a function of improving an adhesive property with the elastic layer may be arranged. That is, the silicone rubber-containing elastic layer only needs to be arranged over the outer peripheral surface of the substrate, and another layer may be arranged between the silicone rubber-containing elastic layer and the substrate. In addition, on the inner surface (surface on the opposite side to the outer surface) of the substrate, a layer for imparting a function, such as abrasion resistance or lubricity, may be further arranged.

When the fixing member is such a fixing roller as illustrated in FIG. 1B, a mandrel formed of a metal, such as aluminum or iron, or an alloy may be used as its substrate, and only needs to have such strength as to resist heating and pressurization in a fixing apparatus. A solid mandrel is used as the substrate in FIG. 1B. However, a hollow mandrel may be used as the substrate, and a heat source such as a halogen lamp may be present therein.

Elastic Layer

The fixing member according to the present disclosure may be used as any one or both of a heating member and a pressurizing member in the fixing apparatus. Further, when the fixing member is used as the heating member, the elastic layer functions as a layer for allowing the outer surface of the heating member to follow the irregularities of paper at the time of fixation. In addition, when the fixing member is used as the pressurizing member, the elastic layer functions as a layer for sufficiently securing the width of a fixing nip to be formed with the heating member. To express those functions in an environment having a temperature as high as about 240° C. in a non-paper passing portion region, the elastic layer contains as a binder a silicone rubber excellent in heat resistance. That is, the elastic layer contains a silicone rubber and metal silicon powder dispersed in the silicone rubber.

Further, the elastic layer may be formed by, for example, curing an addition-curable liquid silicone rubber mixture containing the metal silicon powder and an addition-curable liquid silicone rubber. That is, the elastic layer may be a cured product of the addition-curable liquid silicone rubber mixture, and may be a layer containing a cured product of the addition-curable liquid silicone rubber, and the metal silicon powder which is present in the cured product.

The metal silicon powder and the silicone rubber serving as constituent components of the elastic layer are described in detail below.

Metal Silicon Powder

The metal silicon powder has an aspect ratio of 1.4 or more and 2.5 or less, and a repose angle of 35° or more and 52° or less. In the present disclosure, the aspect ratio of the metal silicon powder is the ratio (long diameter/short diameter) of the long diameter of a particle thereof to the short diameter of the particle. The particle diameters and shapes of the individual particles of the metal silicon powder differ from each other, and hence have distributions. Accordingly, the aspect ratio is determined by, for example, measuring the long diameter and short diameter of each of 100 or more particles of the powder observed with a scanning electron microscope (SEM), calculating the ratio "long diameter/short diameter," and then arithmetically averaging the calculated ratios.

The metal silicon powder may be produced by, for example, reducing silica stone, and pulverizing and classifying the reduced stone. The metal silicon powder has a heat capacity per unit volume of about 1.7 $MJ/m^3 \cdot K$, and the value is smaller than the heat capacity per unit volume of alumina that has been frequently used for improving the thermophysical properties of the silicone rubber-containing elastic layer, that is, about 3.0 $MJ/m^3 \cdot K$. In addition, the thermal conductivity of the metal silicon powder is as high as about 150 W/m·K.

The metal silicon powder having an aspect ratio of 1.4 or more and 2.5 or less itself is commercially available as, for example, "Metallic Silicon #350", "Metallic Silicon #600", "Metallic Silicon #350WB", and "Metallic Silicon #600WB" (all of which are product names, manufactured by Kinsei Matec Co., Ltd.).

In the present disclosure, the pointed part-rounding treatment of the metal silicon powder having an aspect ratio of 1.4 or more and 2.5 or less is performed to adjust the repose angle of the metal silicon powder to 35° or more and 52° or less while substantially maintaining the aspect ratio. A mechanical or physical method may be used in the pointed part-rounding treatment of the metal silicon powder. For example, a particle design/surface modification apparatus (product name: HYBRIDIZATION SYSTEM, manufactured by Nara Machinery Co., Ltd.) includes a rotor that rotates at a high speed, a stator, and a circulation circuit. In addition, the metal silicon powder introduced into the apparatus repeatedly receives mechanical actions including an impact force serving as a main constituent, compression, friction, and a shear force while being dispersed in the machine. The powder whose corners have thus been rounded off is then recovered in a collector. In addition, in a multi-purpose powder treatment apparatus (product name: FACULTY, manufactured by Hosokawa Micron Corporation), the pointed part of the metal silicon powder is rounded by high-speed rotation of a hammer, and the resultant is removed from a discharge port.

The degree of the pointed part-rounding treatment may be mainly adjusted by the number of revolutions of such apparatus and a treatment time. Specifically, the repose angle may be adjusted within the above-mentioned range by, for example, performing the treatment at a peripheral speed of the apparatus of from 60 m/s to 100 m/s for from 3 minutes to 30 minutes. Although the atmosphere under which the pointed part-rounding treatment is performed is not particularly limited, an inert gas atmosphere such as argon is preferred from the viewpoint of suppressing the oxidation of the metal silicon powder. This is because the oxidation of the metal silicon powder may reduce the thermal conductivity of the oxidized portion as compared to that of the unoxidized portion. The repose angle of the metal silicon powder may be measured with, for example, a commercially available powder measurement/powder characteristic evaluation apparatus (product name: POWDER TESTER PT-X, manufactured by Hosokawa Micron Corporation).

Although the particle diameter of the metal silicon powder is not particularly limited, the particle diameter preferably falls within the range of from 0.1 μm to 100 μm, and more preferably falls within the range of from 1 μm to 50 μm. When the particle diameter is set within the ranges, an increase in elastic modulus of the elastic layer due to the incorporation of the metal silicon powder can be suppressed. In addition, a reduction in surface property of the elastic layer can be significantly suppressed. The particle diameter of the metal silicon powder may be determined with, for example, a laser diffraction/scattering particle size distribution-measuring apparatus.

The content of the metal silicon powder in the elastic layer is preferably 15% or more and 55% or less, more preferably 30% or more and 50% or less with respect to the elastic layer in terms of volume ratio. When the content is set within the ranges, the thermal conductivity of the elastic layer can be improved while an increase in heat capacity thereof is suppressed.

Silicone Rubber

The addition-curable liquid silicone rubber contains at least: (a) an organopolysiloxane having an unsaturated aliphatic group such as a vinyl group in a molecule thereof; (b) an organopolysiloxane having active hydrogen bonded to a silicon atom; and (c) a hydrosilylation catalyst. In addition, the addition-curable liquid silicone rubber contains (d) a curing retarder as required.

Component (a): Organopolysiloxane having Unsaturated Aliphatic Group in Molecule thereof;

An example of the organopolysiloxane having an unsaturated aliphatic group such as a vinyl group in a molecule thereof is an organopolysiloxane containing, in one molecule thereof, at least two unsaturated aliphatic groups each of which is bonded to a silicon atom. Specific examples thereof include organopolysiloxanes according to the following items (i) and (ii).

(i) A linear organopolysiloxane having any one or both of intermediate units selected from the group consisting of: an intermediate unit represented by $R_1R_1S_iO$; and an intermediate unit represented by $R_1R_2S_iO$, and molecular ends each represented by $R_1R_1R_2S_iO_{1/2}$ (see the following structural formula 1).

Structural formula 1

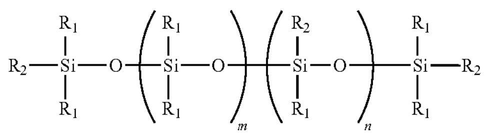

(ii) A linear organopolysiloxane having any one or both of intermediate units selected from the group consisting of: an intermediate unit represented by $R_1R_1S_iO$; and an intermediate unit represented by $R_1R_2S_iO$, and molecular ends each represented by $R_1R_1R_1S_iO_{1/2}$ (see the following structural formula 2).

Structural formula 2

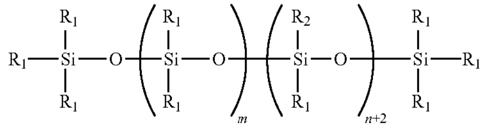

In the structural formula 1 and the structural formula 2, $R_1$s each independently represent an unsubstituted hydrocarbon group free of any unsaturated aliphatic group, $R_2$s each independently represent an unsaturated aliphatic group, and "m" and "n" each independently represent an integer of 0 or more.

Examples of the unsubstituted hydrocarbon group free of any unsaturated aliphatic group represented by each of $R_1$s in the structural formula 1 and the structural formula 2 may include alkyl groups, such as a methyl group, an ethyl group, and a propyl group, and aryl groups such as a phenyl group. $R_1$s each preferably represent a methyl group out of those groups. In addition, examples of the unsaturated aliphatic group represented by each of $R_2$s in the structural formula 1 and the structural formula 2 may include alkenyl groups, such as a vinyl group, an allyl group, and a 3-butenyl group. $R_2$s each preferably represent a vinyl group out of those groups.

In the structural formula 1, the linear organopolysiloxane in which n=0 has unsaturated aliphatic groups only at both ends thereof, and the linear organopolysiloxane in which n=1 or more has unsaturated aliphatic groups at both ends thereof and in a side chain thereof. In addition, the linear organopolysiloxane of the structural formula 2 has unsaturated aliphatic groups only in side chains thereof. The components (a) may be used alone or in combination thereof.

In addition, when the component (a) is used for the elastic layer of the fixing member, its viscosity is preferably 100 $mm^2/s$ or more and 50,000 $mm^2/s$ or less from the viewpoint of moldability.

Component (b): Organopolysiloxane having Active Hydrogen bonded to Silicon Atom;

The organopolysiloxane having active hydrogen bonded to a silicon atom, which serves as a crosslinking agent for the component (a), is a crosslinking agent for forming a crosslinked structure through a hydrosilylation reaction with the unsaturated aliphatic group in the component (a) via the catalytic action of the component (c) to be described later.

Any organopolysiloxane having a Si—H bond may be used as the component (b), and examples thereof include the following organopolysiloxanes (iii) and (iv). The components (b) may be used alone or in combination thereof.

(iii) An organopolysiloxane in which the average number of hydrogen atoms each bonded to a silicon atom is 3 or more per molecule from the viewpoint of forming a crosslinked structure through a reaction with the organopolysiloxane having an unsaturated aliphatic group in a molecule thereof.

(iv) An organopolysiloxane in which an organic group bonded to a silicon atom is such an unsubstituted hydrocarbon group free of any unsaturated aliphatic group as described above. The unsubstituted hydrocarbon group is preferably a methyl group.

In the organopolysiloxane serving as the component (b), the siloxane backbone (—Si—O—Si—) may be any one of linear, branched, and cyclic ones. In addition, the Si—H bond may be present in any siloxane unit in the molecule. Further, specifically, linear organopolysiloxanes represented by the following structural formula 3 and structural formula 4 may each be used as the component (b).

Structural formula 3

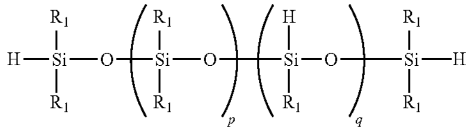

Structural formula 4

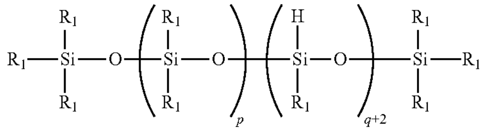

In the structural formula 3 and the structural formula 4, $R_1$s each independently represent an unsubstituted hydrocarbon group free of any unsaturated aliphatic group, "p" represents an integer of 0 or more, and "q" represents an integer of 1 or more. Examples of the unsubstituted hydrocarbon group free of any unsaturated aliphatic group may include the same ones as those given for $R_1$s in the structural formula 1 and the structural formula 2. Of those, a methyl group is preferred.

The blending amount of the component (b) is preferably from 0.1 part by mass to 20 parts by mass, more preferably from 0.3 part by mass to 10 parts by mass with respect to 100 parts by mass of the component (a).

Component (c): Hydrosilylation Catalyst;

For example, a platinum compound may be used as the hydrosilylation (addition curing) catalyst. Specific examples thereof may include a platinum carbonyl cyclovinylmethylsiloxane complex and a 1,3-divinyltetramethyldisiloxane platinum complex. The blending amount of the component (c) is preferably from 0.0001 part by mass to 0.1 part by mass, more preferably from 0.001 part by mass to 0.05 part by mass with respect to 100 parts by mass of the component (a).

Component (d): Curing Retarder;

The curing retarder may be blended in order to adjust the curing reaction rate of hydrosilylation (addition curing). Specific examples of the curing retarder may include 1,3,5,7-tetravinyltetramethylcyclotetrasiloxane, 2-methyl-3-butyn-2-ol, and 1-ethynyl-1-cyclohexanol. The blending amount of the component (d) is preferably from 0.01 part by mass to 2 parts by mass, more preferably from 0.05 part by mass to 1 part by mass with respect to 100 parts by mass of the component (a).

The elastic layer has an elastic modulus of 0.10 MPa or more and 0.40 MPa or less, and a silicone rubber-containing elastic layer having an elastic modulus within the range has excellent flexibility. Accordingly, when the fixing member according to the present disclosure is used as a heating member, its outer surface can be reliably caused to follow the irregularities of paper. In addition, when the fixing member according to the present disclosure is used as a pressurizing member, a sufficient nip width can be secured. The elastic modulus of the elastic layer may be adjusted by the kind and blending amount of the component (a), the kind and blending amount of the component (b), the kind and blending amount of the component (c), and the kind and blending amount of the component (d).

The heat capacity per unit volume of the elastic layer is preferably less than 1.7 $MJ/m^3 \cdot K$. When the heat capacity per unit volume is less than 1.7 $MJ/m^3 \cdot K$, the fixing member is rapidly heated to be conducive to the shortening of a FPOT.

The thickness of the elastic layer is preferably 100 μm or more. Here, when the fixing member is a fixing belt having an endless belt shape, the thickness of the elastic layer is more preferably 200 μm or more and 600 μm or less. When the thickness of the elastic layer is set within the ranges, the above-mentioned functions of the elastic layer can be more reliably exhibited.

Surface Layer

As the surface layer, there may be used, for example, a fluorine resin layer, specifically, a layer containing a fluorine resin exemplified below. Examples of the fluorine resin may include a tetrafluoroethylene-perfluoro(alkyl vinyl ether) copolymer (PFA), polytetrafluoroethylene (PTFE), and a tetrafluoroethylene-hexafluoropropylene copolymer (FEP). In addition, a filler may be incorporated into the surface layer for the purpose of improving thermophysical properties and abrasion resistance to the extent that moldability and a toner release property are not impaired.

The thickness of the surface layer is preferably 10 μm or more and 100 μm or less. When the thickness of the surface layer is 10 μm or more, sufficient durability is obtained. In addition, when the thickness of the surface layer is 100 μm or less, the excellent flexibility of the silicone rubber-containing elastic layer can easily function.

A method of forming the surface layer is not particularly limited, and for example, the following methods may each be used: a method including covering the top of the silicone rubber-containing elastic layer with a product, which is obtained by molding the fluorine resin into a tube shape, via the adhesion layer; and a method including coating the top of the silicone rubber-containing elastic layer with the fine particles of the fluorine resin directly or with a paint obtained by dispersing the fine particles in a solvent, followed by the drying and heat melting of the fine particles or the paint. Those methods are described in more detail below.

Figure 2:
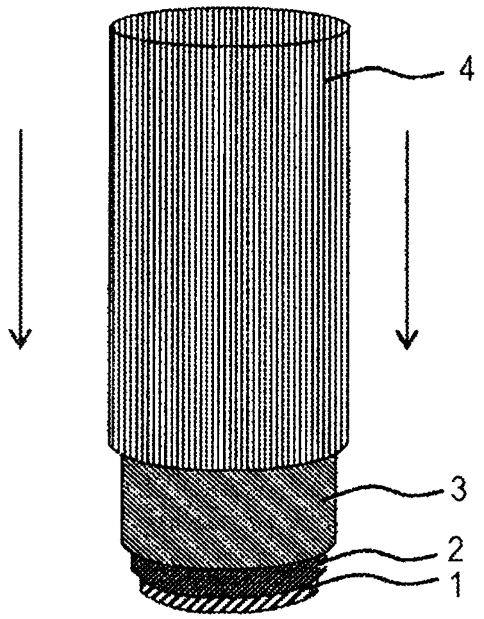
FIG. 2 is an explanatory view of an example of a step of laminating a fluorine resin surface layer.

First, the formation of the surface layer by the coverage with the fluorine resin tube is described. When the inner surface of the fluorine resin tube is subjected to, for example, sodium treatment, excimer laser treatment, or ammonia treatment in advance, the surface can be activated and improved in adhesive property. FIG. 2 is a schematic view for illustrating an example of a step of covering the top of the silicone rubber-containing elastic layer 2 with the fluorine resin tube serving as the surface layer 4 via the adhesion layer 3. Specifically, an adhesive is applied to the surface of the silicone rubber-containing elastic layer 2 to form the adhesion layer 3. The fluorine resin tube serving as the surface layer 4 is caused to cover, and laminated on, the outer surface of the adhesion layer 3.

An addition-curable silicone rubber blended with a self-adhesive component is preferably used as the adhesive. Specifically, a silicone rubber containing an organopolysiloxane having a plurality of alkenyl groups typified by a vinyl group in its molecular chain, a hydrogen organopolysiloxane, and a platinum compound serving as a crosslinking reaction catalyst may be used as the addition-curable silicone rubber. The addition-curable silicone rubber is cured through an addition reaction. A known adhesive may be used as the adhesive formed of such addition-curable silicone rubber.

Although not required when the substrate 1 is a mandrel capable of holding its shape, it is preferred that, when a thin substrate, such as a resin belt or a metal sleeve, to be used for a fixing belt is used, the substrate 1 be held by being externally fitted onto a core in order to prevent deformation at the time of processing. Although a method for the covering with the fluorine resin tube is not particularly limited, for example, a method involving covering the outer surface through use of the adhesive as a lubricant, or a method involving expanding the fluorine resin tube from its outside to cover the outer surface may be used. After the covering, the redundant adhesive remaining between the silicone rubber-containing elastic layer 2 and the fluorine resin tube may be removed by being squeezed out by means (not shown). The thickness of the adhesion layer 3 after the squeezing is preferably 20 μm or less. When the thickness of the adhesion layer is 20 μm or less, an increase in hardness of the fixing member can be easily suppressed, and in the case of use as the heating member, its property of following the irregularities of paper is excellent, and in the case of use as the pressurizing member, a satisfactory fixed image is easily obtained while the narrowing of a fixing nip width is avoided. Next, the adhesion layer 3 is cured through heating with heating means such as an electric furnace for a predetermined period of time, and as required, both end portions of the resultant are processed into a desired length. Thus, the fixing member according to the present disclosure may be obtained.

Next, the formation of the surface layer by fluorine resin coating is described. For fluorine resin coating processing for forming the surface layer, a method, such as an electrostatic coating method with fluorine resin fine particles or spray coating with a fluorine resin paint, may be used. In the case of using the electrostatic coating method, first, the inner surface of a mold is electrostatically coated with fluorine resin fine particles, and the mold is heated to a temperature equal to or higher than the melting point of the fluorine resin, to thereby form a thin film of the fluorine resin on the inner surface of the mold. After that, the inner surface is subjected to adhesion treatment, and then the substrate is inserted. An addition-curable liquid silicone rubber mixture containing at least metal silicon powder having an aspect ratio of 1.4 or more and 2.5 or less, and a repose angle of 35° or more and 52° or less, and for example, an addition-curable liquid silicone rubber is injected between the substrate and the fluorine resin. The rubber mixture is cured, followed by demolding. Thus, the fixing member according to the present disclosure may be obtained.

Method of Producing Fixing Member

A method of producing the fixing member according to the present disclosure includes, for example, the following elastic layer-forming step.

A step of forming a silicone rubber-containing elastic layer having an elastic modulus of 0.10 MPa or more and 0.40 MPa or less by curing the layer of the addition-curable liquid silicone rubber mixture formed on the outer peripheral surface of the substrate under heating.

In addition, the method of producing the fixing member according to the present disclosure may include the following step.

A step of preparing an addition-curable liquid silicone rubber mixture containing at least the metal silicon powder and the components (a) to (c).

In the production method of the present disclosure, the order of the above-mentioned respective steps may be appropriately set, and these steps may be performed simultaneously (in parallel). At the time of the formation of the silicone rubber-containing elastic layer and the surface layer, the above-mentioned methods of forming the silicone rubber-containing elastic layer and the surface layer may be used.

Fixing Apparatus

A fixing apparatus according to the present disclosure includes the above-mentioned fixing member according to the present disclosure. Specifically, the fixing apparatus is a fixing apparatus to be used in an electrophotographic image forming apparatus, and the fixing member according to the present disclosure is arranged as a fixing belt, a fixing roller, or a fixing film, and/or a pressurizing belt, a pressurizing roller, or a pressurizing film. The electrophotographic image forming apparatus is, for example, an electrophotographic image forming apparatus including: a photosensitive member; means for forming a latent image; means for developing the formed latent image with toner; means for transferring the developed toner image onto a recording material; and means for fixing the toner image on the recording material.

Figure 3:
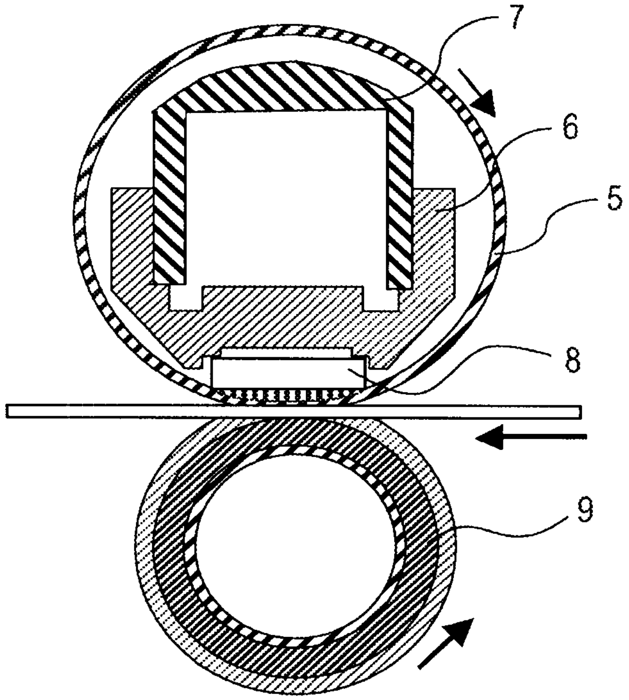
FIG. 3 is a sectional view for illustrating an example of a fixing apparatus including the fixing member according to the present disclosure.

An example of the fixing apparatus is illustrated in FIG. 3. In FIG. 3, a fixing belt 5 having an endless belt shape is inscribed with a belt guide member 6 and a stay 7 with a margin in its perimeter. A heating body 8 has a layer obtained by applying, onto a heating body substrate formed of alumina, ceramic, or the like, an electrical resistance material such as a silver-palladium (Ag/Pd) alloy, which generates heat when a current is passed therethrough, in a line shape or a belt shape through screen printing or the like. Further, a glass coating layer having a thickness of about 10 μm is sequentially formed thereon for protecting the electrical resistance material and securing an insulating property. In addition, a thermistor is brought into abutment with the rear surface of the heating body substrate, and the surface temperature of the fixing belt 5 can be kept at the temperature at which the toner image can be fixed by controlling power to be supplied to the electrical resistance material in accordance with a temperature sensed by the thermistor.

A pressurizing roller 9 is brought into pressure contact with the heating body 8 through the fixing belt 5, and is rotationally driven by pressurizing roller-driving means. The pressurizing roller 9 is rotationally driven, and the fixing belt 5 rotates following the rotation. When a recording material such as paper having formed thereon an unfixed image is sandwiched and conveyed between the fixing belt 5 and the pressurizing roller 9, the unfixed image is fixed onto the recording material under heating. The fixing apparatus is a fixing apparatus of such a type as to apply a relatively low pressurizing force.

The fixing apparatus including the fixing belt and the pressurizing roller as its fixing members has been given above as an example. However, the fixing apparatus according to the present disclosure only needs to include the fixing member according to the present disclosure as a fixing belt, a fixing roller, or a fixing film, and/or a pressurizing belt, a pressurizing roller, or a pressurizing film, and is hence not limited to that illustrated in FIG. 3.

According to one aspect of the present disclosure, the following fixing member can be obtained: despite the fact that the fixing member includes an elastic layer containing metal silicon powder having a high aspect ratio, its breakage or plastic deformation hardly occurs even when the member is used for a long time period. According to other aspects of the present disclosure, the fixing apparatus and the electrophotographic image forming apparatus each of which is capable of stably forming a high-quality electrophotographic image can be obtained. According to still another aspect of the present disclosure, the addition-curable liquid silicone rubber mixture providing the following silicone rubber cured product can be obtained: while the cured product contains metal silicon powder having a high aspect ratio, its breakage or plastic deformation hardly occurs even when the cured product is repeatedly compressed.

EXAMPLES

The present disclosure is described in more detail below by way of Examples.

First, methods of measuring the aspect ratio and angle of repose of metal silicon powder are described. As described above, the aspect ratio of the metal silicon powder was determined by measuring the long diameter and short diameter of each of 100 or more particles of the powder observed with a scanning electron microscope (SEM), calculating the ratio "long diameter/short diameter," and arithmetically averaging the calculated ratios. As described above, the repose angle was measured with "POWDER TESTER PT-X" (product name, manufactured by Hosokawa Micron Corporation) under the following conditions:

sieve: an aperture of 150 μm and a wire diameter of 100 μm;
amplitude: 0.5 mm;
vibration time: 1,800 seconds or more (until the metal silicon powder fell in the 360-degree surroundings of a dish); and
slow down time: 10 seconds.

Metal silicon powder in the elastic layer of a fixing member may be recovered by, for example, calcining the elastic layer to decompose and remove a silicone rubber in the elastic layer. Then, the repose angle of the recovered metal silicon powder may be measured by the above-mentioned method. According to an investigation made by the inventors, the repose angle of the metal silicon powder recovered from the elastic layer by the above-mentioned method was the same as the repose angle of the metal silicon powder serving as a raw material.

Example 1

(1) Pointed Part-Rounding Treatment of Metal Silicon Powder

100 Grams of metal silicon powder (product name: #350WB, manufactured by Kinsei Matec Co., Ltd.) was loaded into HYBRIDIZATION SYSTEM NHS-1 (product name, manufactured by Nara Machinery Co., Ltd.), and was treated at a peripheral speed of 100 m/s (a rotational speed of 8,300 $min^{-1}$) under an argon atmosphere serving as an inert gas for 15 minutes. The recovered metal silicon powder had an aspect ratio of 1.5 and a repose angle of 40°.

(2) Preparation of Addition-Curable Liquid Silicone Rubber Mixture

First, 100 parts by mass of an organopolysiloxane having vinyl groups serving as unsaturated aliphatic groups only at both terminals of its molecular chain and further having a methyl group serving as an unsubstituted hydrocarbon group free of any unsaturated aliphatic group (viscosity: 5,000 $mm^2/s$, hereinafter referred to as "Vi") was prepared as a component (a).

Next, 183.5 parts by mass of the metal silicon powder obtained in the section (1) was weighed and added to the Vi.

Next, 0.10 part by mass of 1,3,5,7-tetravinyltetramethylcyclotetrasiloxane (product name: SIT7900.0, manufactured by Gelest, INC.) serving as a curing retarder was added as a component "d" into the mixture of the Vi and the metal oxide powder.

Next, 0.03 part by mass of a platinum carbonyl cyclovinylmethylsiloxane complex (product name: SIP6829.2, manufactured by Gelest, INC.) serving as a hydrosilylation catalyst was added as a component (c) into the mixture of the Vi, the metal silicon powder, and the curing retarder.

Further, 1.5 parts by mass of a silicone polymer having a linear siloxane backbone and having active hydrogen bonded to silicon only in a side chain thereof (viscosity: 30 $mm^2/s$, hereinafter referred to as "SiH") was weighed as a component (b). The weighed SiH was added to the mixture of the Vi, the metal silicon powder, the curing retarder, and the platinum catalyst, and the materials were sufficiently mixed to provide an addition-curable liquid silicone rubber mixture containing 43% of the metal silicon powder in terms of volume ratio.

(3) Production of Fixing Belt

Next, a fixing belt was produced as described below using the resultant addition-curable liquid silicone rubber mixture.

A nickel electrocast endless sleeve having an inner diameter of 30 mm, a width of 400 mm, and a thickness of 40 μm was prepared as a substrate. In a series of production steps, the endless sleeve was handled while a core was inserted into the sleeve.

First, a primer (product name: DY39-051 A/B, manufactured by DuPont Toray Specialty Materials K.K.) was applied to the outer peripheral surface of the substrate in a substantially uniform manner. After the solvent had been dried, baking treatment was performed in an electric furnace at 160° C. for 30 minutes. Subsequently, the addition-curable liquid silicone rubber mixture was applied onto the substrate subjected to the primer treatment by a ring coating method so as to have a thickness of 300 μm. The endless belt having applied thereto the silicone rubber mixture was heated in an electric furnace at 160° C. for 1 minute (primary curing), and was then heated in an electric furnace at 200° C. for 4 hours (secondary curing) so that the silicone rubber mixture was cured. Thus, a silicone rubber-containing elastic layer containing the metal silicon powder was formed.

Next, while the surface of the resultant endless belt was rotated in its peripheral direction at a moving speed of 20 mm/sec, the surface of the silicone rubber-containing elastic layer containing the metal silicon powder was irradiated with UV light by using a UV lamp placed at a distance of 10 mm from the surface. A low-pressure mercury UV lamp (product name: GLQ500US/11, manufactured by Toshiba Lighting & Technology Corporation) was used as the UV lamp, and the irradiation was performed in an air atmosphere at room temperature for 6 minutes.

Next, an addition-curable silicone rubber adhesive (product name: SE1819CV A/B, manufactured by DuPont Toray Specialty Materials K.K.) was applied in a substantially uniform manner to the surface of the elastic layer of the endless belt so as to have a thickness of 20 μm. Next, a fluorine resin tube having an inner diameter of 29 mm and a thickness of 30 μm (product name: KURANFLON-LT, manufactured by Kurabo Industries Ltd.) was laminated on the adhesive. After that, the belt was uniformly squeezed from above the fluorine resin tube. Thus, the resultant adhesive was squeezed out of a space between the elastic layer and the fluorine resin tube so as to be sufficiently thin.

The resultant endless belt was heated in an electric furnace at 200° C. for 1 hour so that the adhesive was cured. Thus, a surface layer formed of the fluorine resin tube was fixed onto the elastic layer. Both the end portions of the resultant endless belt were cut. Thus, a fixing belt having a width of 341 mm was obtained.

(4) Characteristic Evaluation of Elastic Layer of Fixing Belt

First, the top of the substrate was subjected to primer treatment by the same method as the above-mentioned method of producing a fixing belt, and then an elastic layer (elastic layer after its secondary curing) having a thickness of 300 μm was formed by a ring coating method.

(4-1) Tensile Modulus of Elastic Layer

To recognize that the elastic layer had low hardness, the tensile modulus of the elastic layer was measured. Specifically, the elastic layer was cut out with a punching die (JIS No. 3 dumbbell type), and the thickness of the rubber near its center serving as a measurement site was measured. Next, the elastic layer thus cut out was tested with a tensile tester (product name: STROGRAPH EII-L1, manufactured by Toyo Seiki Seisaku-sho, Ltd.) at a tensile rate of 500 mm/min and room temperature. The tensile modulus was determined as follows: a graph in which the strain of the sample was indicated by an axis of abscissa and a tensile stress was indicated by an axis of ordinate was produced from the measurement results; the measurement data was linearly approximated in the strain range of from 0% to 100%; and the slope of the resultant straight line was adopted as the tensile modulus. As a result, the tensile modulus of the elastic layer was 0.30 MPa.

(4-2) Heat Capacity Per Unit Volume of Elastic Layer

A heat capacity CV per unit volume was calculated from the following equation:

$$CV=Cp \times \rho$$

where Cp represents a specific heat at constant pressure (J/(kg·K)), and ρ represents a density (kg/m3). The values of the specific heat at constant pressure and the density in the equation were determined by the following methods.

Specific Heat at Constant Pressure CP

The specific heat at constant pressure of the elastic layer was measured with a differential scanning calorimeter (product name: DSC823e, manufactured by Mettler-Toledo). Specifically, pans made of aluminum were used as a pan for a sample and a pan for reference. First, as blank measurement, under a state in which both the pans were empty, measurement was performed by the following program: a temperature in the calorimeter was kept at a temperature of 15° C. for 10 minutes, was then increased to a temperature of 215° C. at a rate of temperature increase of 10° C./min, and was kept at a temperature of 215° C. for 10 minutes. Next, measurement was performed through use of 10 mg of synthetic sapphire whose specific heat at constant pressure was known as a reference substance by the same program. Next, the same amount of a measurement sample as that of the sapphire for reference, that is, 10 mg thereof was cut out of the elastic layer portion. After that, the sample was set in the sample pan, and measurement was performed by the same program. Those measurement results were analyzed with specific heat analysis software attached to the differential scanning calorimeter, and the specific heat at constant pressure CP at 25° C. was calculated from the average of the 5 measurement results. As a result, the specific heat at constant pressure CP of the silicone rubber-containing elastic layer was 1.03 J/(g·K).

Density ρ

The density of the elastic layer was measured with a dry automatic densimeter (product name: ACCUPYC 1330-01, manufactured by Shimadzu Corporation). Specifically, a sample cell having a volume of 10 $cm^3$ was used, and a sample was cut out of the elastic layer so as to account for 80% of the volume of the cell. The mass of the sample was measured, and then the sample was loaded into the sample cell. The sample cell was set in a measuring portion in the apparatus. Helium was used as a gas for measurement, and the cell was purged with the gas. After that, the volume of the sample was measured 10 times. The density of the sample was calculated from the mass of the sample and the measured volume for each measurement, and the average of the calculated values was determined. As a result, the density ρ of the silicone rubber-containing elastic layer was 1.56 $g/cm^3$.

The heat capacity CV per unit volume was calculated from the thus determined specific heat at constant pressure CP and density ρ of the silicone rubber-containing elastic layer, and as a result, was found to be 1.61 $MJ/m^3 \cdot K$.

(4-3) Thermal Conductivity of Elastic Layer in its Thickness Direction

The thermal conductivity λ of the elastic layer in its thickness direction was calculated from the following equation:

$$\lambda = \alpha \times Cp \times \rho$$

where λ represents the thermal conductivity of the elastic layer in the thickness direction (W/(m·)), α represents a thermal diffusivity in the thickness direction ($m^2/s$), Cp represents a specific heat at constant pressure (J/(kg·K)), and ρ represents a density ($kg/m^3$). In this case, for the specific heat at constant pressure Cp and the density ρ of the elastic layer, the units of the values determined by the above-mentioned methods were converted. The value of the thermal diffusivity in the thickness direction was determined by the following method.

Thermal Diffusivity α

The thermal diffusivity of the elastic layer in the thickness direction was measured with a periodical heating method thermal diffusivity measurement system (product name: FTC-1, manufactured by Ulvac-Riko, Inc.) at room temperature (25° C.). A sample piece having an area measuring 8 mm by 12 mm was cut out of the elastic layer with a cutter, and a total of 5 samples were produced. The thickness of each of the samples was measured. Next, the thermal diffusivity of each of the samples was measured a total of 5 times, and the average of the measured values was determined. The thermal conductivity λ of the silicone rubber-containing elastic layer was calculated from the specific heat at constant pressure Cp (J/(kg·K)) and the density ρ ($kg/m^3$) of the elastic layer each of which had been subjected to unit conversion, and the measured thermal diffusivity α ($m^2/s$), and as a result, was found to be 0.9 W/(m·K).

Figure 4:
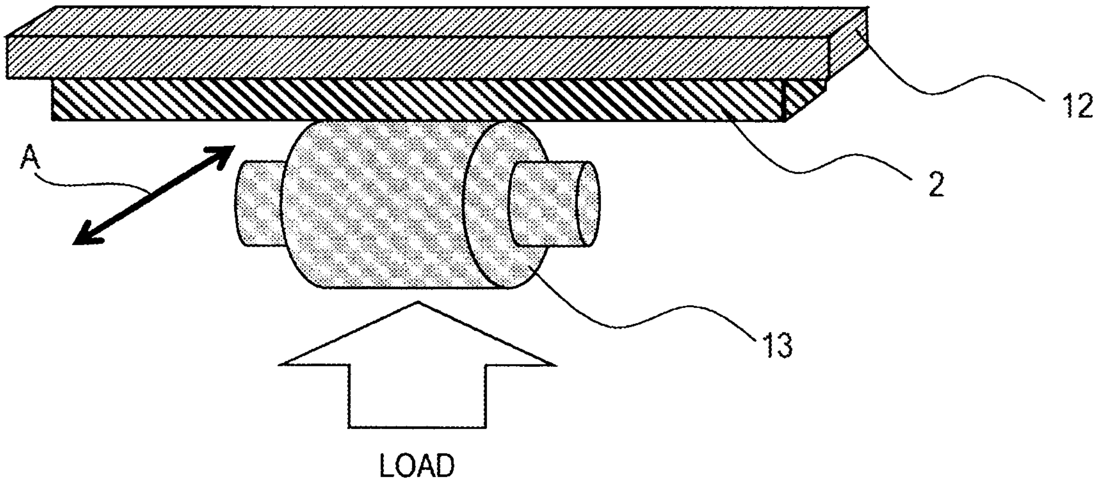
FIG. 4 is a perspective view of a jig for evaluating the pressure resistance durability of an elastic layer according to the present disclosure.

(5) Evaluation of Pressure Resistance Durability of Elastic Layer of Fixing Belt First, the top of a stainless-steel plate measuring 50 mm by 50 mm (represented by reference numeral 12 in FIG. 4) was subjected to primer treatment by the same method as the method of producing a fixing belt, and then the elastic layer 2 (elastic layer after its secondary curing) having a thickness of 1 mm was formed with a mold by press molding. Thus, a sample was obtained. A total of 4 samples were produced, and the elastic layer of each of the samples was evaluated for its pressure resistance durability with a jig illustrated in FIG. 4. The evaluation was performed by using the average of time periods required for the breakage or plastic deformation of the elastic layer 2 to occur when a pressing roller 13 (having a width of 10 mm and a diameter of 15 mm) was moved back and forth in the direction indicated by the arrow A in FIG. 4 under the evaluation conditions of a sample surface temperature of 240° C. and a load of 15 N. As a result, no breakage or plastic deformation of the elastic layer 2 was observed even after the lapse of 600 minutes, and hence the sample was found to be extremely excellent in pressure resistance durability.

(6) Evaluation of Fixing Belt

The fixing belt obtained in the section (3) was mounted on the fixing apparatus of an office-use multifunction machine (product name: imageRUNNER ADVANCE C5051, manufactured by Canon Inc.). Then, an image forming operation in which a cyan solid image was formed on A4 size paper was continuously performed on 300,000 sheets of the paper. After that, the fixing belt was removed from the fixing apparatus, and the presence or absence of the breakage or plastic deformation of its elastic layer was visually observed and evaluated by the following criteria. In addition, the solid image on the 300,000th sheet was visually observed, and the presence or absence of gloss unevenness resulting from a fixing step was evaluated by the following criteria.

Criteria for Evaluation of Elastic Layer

Rank A: No breakage or plastic deformation of the elastic layer was observed.

Rank B: The breakage or plastic deformation of the elastic layer was observed.

Image Quality Evaluation

Rank A: No gloss unevenness was observed.
Rank B: Gloss unevenness was observed.

Example 2

Figure 5A:
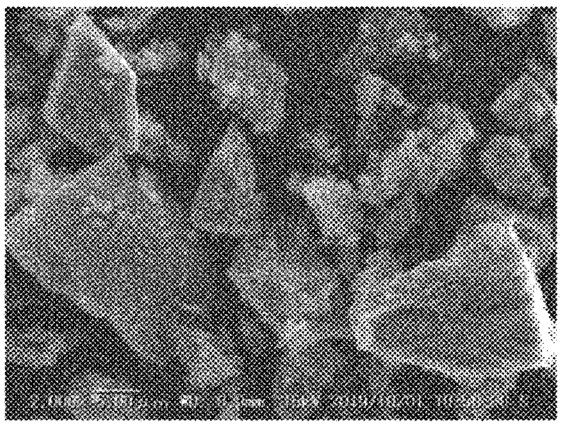
FIG. 5A is a SEM observation image of metal silicon powder before its pointed part-rounding treatment.
Figure 5B:
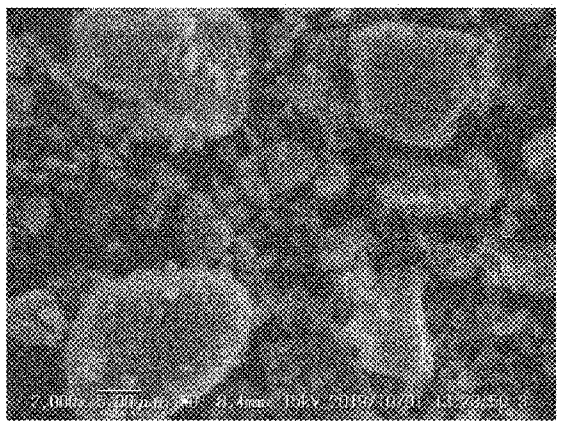
FIG. 5B is a SEM observation image of the metal silicon powder after the pointed part-rounding treatment.

The pointed part-rounding treatment of the metal silicon powder was performed in the same manner as in Example 1 except that the treatment was performed under air. The recovered metal silicon powder had an aspect ratio of 1.5 and a repose angle of 39°. FIG. 5A and FIG. 5B are SEM observation images of the metal silicon powder before (FIG. 5A) and after (FIG. 5B) the pointed part-rounding treatment.

Next, an addition-curable liquid silicone rubber mixture containing 43% of the metal silicon powder in terms of volume ratio was obtained in the same manner as in Example 1 except that the metal silicon powder was used. Next, an elastic layer and a fixing belt for evaluations were each produced in the same manner as in Example 1 except that the resultant addition-curable liquid silicone rubber mixture was used, followed by their evaluations.

Example 3

The pointed part-rounding treatment of the metal silicon powder was performed in the same manner as in Example 1 except that the treatment was performed at a peripheral speed of 80 m/s (a rotational speed of 6,600 $min^{-1}$) under air for 5 minutes. The resultant metal silicon powder had an aspect ratio of 1.5 and a repose angle of 46°. An addition-curable liquid silicone rubber mixture containing 43% of the metal silicon powder in terms of volume ratio was obtained in the same manner as in Example 1 except that: the metal silicon powder was used; and the amount of the component (b) was set to 1.25 parts by mass. Next, an elastic layer and a fixing belt for evaluations were each produced in the same manner as in Example 1 except that the resultant addition-curable liquid silicone rubber mixture was used, followed by their evaluations.

Example 4

Metal silicon powder subjected to pointed part-rounding treatment, the powder having an aspect ratio of 1.5 and a repose angle of 39°, was prepared in the same manner as in Example 2. An addition-curable liquid silicone rubber mixture containing 43% of the metal silicon powder in terms of volume ratio was obtained in the same manner as in Example 1 except that: the metal silicon powder was used; and the amount of the component (b) was set to 1.1 parts by mass. Next, an elastic layer and a fixing belt for evaluations were each produced in the same manner as in Example 1 except that the resultant addition-curable liquid silicone rubber mixture was used, followed by their evaluations.

Example 5

The pointed part-rounding treatment of the metal silicon powder was performed in the same manner as in Example 1 except that the treatment was performed at a peripheral speed of 60 m/s (a rotational speed of 5,000 $min^{-1}$) under air for 3 minutes. The resultant metal silicon powder had an aspect ratio of 1.5 and a repose angle of 52°. Next, an addition-curable liquid silicone rubber mixture containing 43% of the metal silicon powder in terms of volume ratio was obtained in the same manner as in Example 1 except that: the metal silicon powder was used; and the amount of the component (b) was set to 1.1 parts by mass. Next, an elastic layer and a fixing belt for evaluations were each produced in the same manner as in Example 1 except that the resultant addition-curable liquid silicone rubber mixture was used, followed by their evaluations.

Example 6

An addition-curable liquid silicone rubber mixture containing 43% of the metal silicon powder in terms of volume ratio was obtained in the same manner as in Example 3 except that the amount of the component (b) was set to 1.4 parts by mass. Next, an elastic layer and a fixing belt for evaluations were each produced in the same manner as in Example 1 except that the resultant addition-curable liquid silicone rubber mixture was used, followed by their evaluations.

Example 7

The pointed part-rounding treatment of the metal silicon powder was performed in the same manner as in Example 1. The recovered metal silicon powder was classified, and metal silicon powder having a particle diameter in the range of from 5 μm to 10 μm was fractionated. The metal silicon powder had an aspect ratio of 1.9 and a repose angle of 41°. An addition-curable liquid silicone rubber mixture containing 43% of the metal silicon powder in terms of volume ratio was obtained in the same manner as in Example 1 except that: the metal silicon powder was used; and the amount of the component (b) was set to 1.3 parts by mass. An elastic layer and a fixing belt for evaluations were each produced in the same manner as in Example 1 except that the resultant addition-curable liquid silicone rubber mixture was used, followed by their evaluations.

Example 8

The pointed part-rounding treatment of the metal silicon powder was performed in the same manner as in Example 1. The recovered metal silicon powder was classified, and metal silicon powder having a particle diameter of 10 μm or more was fractionated. The metal silicon powder had an aspect ratio of 2.2 and a repose angle of 43°. An addition-curable liquid silicone rubber mixture containing 43% of the metal silicon powder in terms of volume ratio was obtained in the same manner as in Example 1 except that: the metal silicon powder was used; and the amount of the component (b) was set to 1.3 parts by mass. An elastic layer and a fixing belt for evaluations were each produced in the same manner as in Example 1 except that the resultant addition-curable liquid silicone rubber mixture was used, followed by their evaluations.

Comparative Example 1

An addition-curable liquid silicone rubber mixture containing 43% of metal silicon powder (product name: #350WB, aspect ratio: 1.5, angle of repose: 55°, manufactured by Kinsei Matec Co., Ltd.) in terms of volume ratio was obtained in the same manner as in Example 1 except that: the metal silicon powder was used as it was without being subjected to any pointed part-rounding treatment; and the amount of the component (b) was set to 1.1 parts by mass. An elastic layer and a fixing belt for evaluations were each produced in the same manner as in Example 1 except that the resultant addition-curable liquid silicone rubber mixture was used, followed by their evaluations. In the evaluation of the fixing belt according to this comparative example, a broken portion occurred in the elastic layer at the time point when the image was formed on the 10,000th sheet, and hence the evaluation was stopped. Accordingly, no image quality evaluation was performed.

Comparative Example 2

An addition-curable liquid silicone rubber mixture containing 43% of the metal silicon powder in terms of volume ratio was obtained in the same manner as in Comparative Example 1 except that the amount of the component (b) was set to 1.4 parts by mass. An elastic layer and a fixing belt for evaluations were each produced in the same manner as in Example 1 except that the resultant addition-curable liquid silicone rubber mixture was used, followed by their evaluations.

The metal silicon powder incorporated into the elastic layer of the fixing belt according to Comparative Example 1 was not subjected to any pointed part-rounding treatment, and hence had a repose angle of more than 52°. Accordingly, the time period required for the breakage or plastic deformation of the elastic layer to occur in its pressure resistance durability test was 10 minutes, and was hence extremely short as compared to the time periods in the elastic layers according to Examples.

Meanwhile, the elastic layer according to Comparative Example 2 was relatively excellent in pressure resistance durability. However, the elastic layer had an elastic modulus of more than 0.40 MPa, and was hence poor in flexibility. Accordingly, the fixing belt according to Comparative Example 2 could not follow irregularities formed by the fibers of the paper serving as a recording material, and hence gloss unevenness that probably resulted from the softening and melting unevenness of the toner was observed.

TABLE 1

| | Metal silicon powder | | Elastic layer | | | | | Fixing belt | |
|---|---|---|---|---|---|---|---|---|---|
| | Aspect ratio (long diameter/short diameter) | Angle of repose (°) | Volume ratio of metal silicon powder (vol %) | Elastic modulus (MPa) | Heat capacity per unit volume ($MJ/m^3 \cdot K$) | Thermal conductivity ($W/m \cdot K$) | Pressure resistance durability | Paper passing endurance evaluation rank | Image quality evaluation rank |
| Example 1 | 1.5 | 40 | 43 | 0.30 | 1.61 | 0.9 | 600 minutes or more | A | A |
| Example 2 | 1.5 | 39 | 43 | 0.30 | 1.61 | 0.8 | 390 minutes | A | A |
| Example 3 | 1.5 | 46 | 43 | 0.30 | 1.61 | 0.8 | 240 minutes | A | A |
| Example 4 | 1.5 | 39 | 43 | 0.10 | 1.61 | 0.8 | 150 minutes | A | A |
| Example 5 | 1.5 | 52 | 43 | 0.30 | 1.61 | 0.8 | 100 minutes | A | A |
| Example 6 | 1.5 | 46 | 43 | 0.40 | 1.61 | 0.8 | 600 minutes or more | A | A |
| Example 7 | 1.9 | 41 | 43 | 0.30 | 1.61 | 0.9 | 450 minutes | A | A |
| Example 8 | 2.2 | 43 | 43 | 0.30 | 1.61 | 0.9 | 350 minutes | A | A |
| Comparative Example 1 | 1.5 | 55 | 43 | 0.30 | 1.61 | 1.0 | 10 minutes | B | — |
| Comparative Example 2 | 1.5 | 55 | 43 | 0.50 | 1.61 | 1.0 | 120 minutes | A | B |

Evaluation Result

The evaluation results of Examples and Comparative Examples shown in Table 1 are described below. In each of Examples 1 to 8, the silicone rubber-containing elastic layer has an elastic modulus of 0.10 MPa or more and 0.40 MPa or less (about 15° or less in terms of JIS A hardness (JIS K 6253)), and is hence excellent in flexibility. In addition, it is understood from the result of the image quality evaluation of each of the fixing belts of Examples 1 to 8 that the belt followed the irregularities of the fibers of the paper serving as a recording material in a fixing nip to suppress the occurrence of the softening and melting unevenness of toner, and hence a high-quality image was obtained. In addition, the silicone rubber-containing elastic layers each contain the metal silicon powder having an aspect ratio of 1.4 or more and 2.5 or less, and a repose angle of 35° or more and 52° or less, and the pressure resistance durability of each of the elastic layers is as satisfactory as 100 minutes or more. Further, it was found from the result of the paper passing endurance evaluation of each of the fixing belts that, even after the 300,000 sheets had been passed, no breakage or plastic deformation of the silicone rubber-containing elastic layer was observed in the non-paper passing portion of the fixing belt, and hence the durability of the belt was satisfactory.

The present disclosure is not limited to the embodiments described above, and various changes and modifications may be made without departing from the spirit and scope of the present disclosure. The following claims are appended hereto in order to make the scope of the present disclosure public.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing member comprising:

a substrate; and an elastic layer arranged on the substrate, the elastic layer containing a silicone rubber and metal silicon powder dispersed in the silicone rubber, the elastic layer having an elastic modulus of 0.10 MPa to 0.40 MPa, and the metal silicon powder having an aspect ratio of 1.4 to 2.5, and having a repose angle of 35° to 52°.

2. The fixing member according to claim 1, wherein a content of the metal silicon powder in the elastic layer is 15% to 55% with respect to the elastic layer in terms of volume ratio.

3. The fixing member according to claim 1, wherein the elastic layer has a heat capacity per unit volume of less than 1.7 $MJ/m^3 \cdot K$.

4. A fixing apparatus comprising a fixing member, the fixing member comprising:

a substrate; and an elastic layer arranged on the substrate, the elastic layer containing a silicone rubber and metal silicon powder dispersed in the silicone rubber, the elastic layer having an elastic modulus of 0.10 MPa to 0.40 MPa, and the metal silicon powder having an aspect ratio of 1.4 to 2.5, and having a repose angle of 35° to 52°.

5. An electrophotographic image forming apparatus comprising the fixing apparatus according to claim 4.

6. An addition-curable liquid silicone rubber mixture comprising:

an addition-curable liquid silicone rubber; and metal silicon powder, the metal silicon powder having an aspect ratio of 1.4 to 2.5, and having a repose angle of 35° to 52°.

7. The addition-curable liquid silicone rubber mixture according to claim 6, wherein the addition-curable liquid silicone rubber contains (a) an organopolysiloxane having an unsaturated aliphatic group in a molecule thereof, (b) an organopolysiloxane having active hydrogen bonded to a silicon atom, and (c) a hydrosilylation catalyst.

8. The fixing member according to claim 1, wherein the metal silicon powder has undergone a pointed part-rounding treatment.

* * * * *